US009218718B2

(12) United States Patent
Barclay et al.

(10) Patent No.: US 9,218,718 B2
(45) Date of Patent: Dec. 22, 2015

(54) SELECTIVE FILTERING OF FEED PUBLICATION OF WAGERING GAME ACTIVITY

(75) Inventors: Brian J. Barclay, Atlanta, GA (US); Andrew C. Guinn, Chicago, IL (US); Travis N. Nelson, Canton, GA (US); Richard B. Robbins, Glenview, IL (US); Justin C. Weber, Chicago, IL (US); John R. Werneke, Naperville, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/600,837

(22) Filed: Aug. 31, 2012
(Under 37 CFR 1.47)

(65) Prior Publication Data

US 2013/0210518 A1 Aug. 15, 2013

Related U.S. Application Data

(60) Provisional application No. 61/529,551, filed on Aug. 31, 2011.

(51) Int. Cl.

*A63F 13/00* (2014.01)
*G07F 17/32* (2006.01)

(52) U.S. Cl.

CPC .......... *G07F 17/3258* (2013.01); *G07F 17/323* (2013.01)

(58) Field of Classification Search

CPC ....... G06Q 10/105; A63F 13/30; A63F 13/33; A63F 13/332; A63F 13/87
USPC ...................................................... 463/20, 27
See application file for complete search history.

(56) References Cited

U.S. PATENT DOCUMENTS

| | | | |
|---|---|---|---|
| 5,197,736 | A | 3/1993 | Backus et al. |
| 5,632,485 | A | 5/1997 | Woodland et al. |

(Continued)

FOREIGN PATENT DOCUMENTS

| | | |
|---|---|---|
| WO | WO-9719736 | 6/1997 |
| WO | WO-2009005657 | 1/2009 |

(Continued)

OTHER PUBLICATIONS

U.S. Appl. No. 13/789,133, filed Mar. 7, 2013, Guinn, Andrew C., et al.

(Continued)

*Primary Examiner* — James S McClellan
(74) *Attorney, Agent, or Firm* — DeLizio Law, PLLC

(57) ABSTRACT

A method comprises receiving a feed of a number of messages providing notification of wagering game activity, wherein the wagering game activity occurred via at least one of a wagering game machine at a wagering game establishment and an online wagering game website. The method includes storing the number of messages. The method includes filtering the number of messages to create a subset of messages, wherein the filtering is based on at least one of an operator criteria and a player criteria. The operator criteria and the player criteria comprises at least one of a jackpot win, a progressive win, an entry into a bonus round, and a win where a monetary amount won exceeds a threshold multiplier of an amount wagered. The method includes publishing the subset of messages to a computing device associated with the wagering game player.

20 Claims, 9 Drawing Sheets

(56) References Cited

U.S. PATENT DOCUMENTS

| | | | |
|---|---|---|---|
| 5,720,662 | A | 2/1998 | Homes, Jr. et al. |
| 5,848,936 | A | 12/1998 | Morrison |
| 5,851,148 | A | 12/1998 | Brune et al. |
| 5,857,909 | A | 1/1999 | Rubin |
| 6,001,016 | A | 12/1999 | Walker et al. |
| 6,012,983 | A | 1/2000 | Walker et al. |
| 6,068,552 | A | 5/2000 | Walker et al. |
| 6,120,031 | A | 9/2000 | Adams |
| 6,190,255 | B1 | 2/2001 | Thomas et al. |
| 6,311,976 | B1 | 11/2001 | Yoseloff |
| 6,361,437 | B1 | 3/2002 | Walker et al. |
| 6,364,313 | B1 | 4/2002 | Moody |
| 6,416,406 | B1 | 7/2002 | Duhamel |
| 6,746,328 | B2 | 6/2004 | Cannon et al. |
| 6,913,262 | B2 | 7/2005 | Berman |
| 7,322,887 | B2 | 1/2008 | Belger et al. |
| 7,618,319 | B2 | 11/2009 | Casey et al. |
| 7,740,245 | B2 | 6/2010 | Tarantino |
| 7,744,453 | B2 | 6/2010 | Pacey |
| 7,993,195 | B2 | 8/2011 | Belger et al. |
| 8,172,687 | B2 | 5/2012 | Gagner et al. |
| 2002/0151349 | A1 | 10/2002 | Joshi |
| 2003/0100361 | A1 | 5/2003 | Sharpless et al. |
| 2003/0224847 | A1 | 12/2003 | Jaimet |
| 2005/0055113 | A1 | 3/2005 | Gauselmann |
| 2006/0084486 | A1 | 4/2006 | Belger et al. |
| 2006/0247039 | A1 | 11/2006 | Lerner et al. |
| 2007/0208751 | A1 | 9/2007 | Cowan et al. |
| 2008/0220848 | A1 | 9/2008 | Adiraju et al. |
| 2009/0117990 | A1 | 5/2009 | Englman et al. |
| 2009/0131160 | A1 | 5/2009 | Torres |
| 2009/0264190 | A1 | 10/2009 | Davis et al. |
| 2010/0016063 | A1 | 1/2010 | Jaffe et al. |
| 2010/0056251 | A1 | 3/2010 | Jaffe et al. |
| 2010/0304843 | A1 | 12/2010 | Aoki et al. |
| 2011/0021266 | A1 | 1/2011 | Jaffe et al. |
| 2011/0045892 | A1 | 2/2011 | Vann et al. |
| 2011/0201403 | A1 | 8/2011 | Jaffe et al. |
| 2011/0244949 | A1 | 10/2011 | Gagner et al. |
| 2014/0018158 | A1 | 1/2014 | Guinn et al. |

FOREIGN PATENT DOCUMENTS

| | | | | |
|---|---|---|---|---|
| WO | 2009/042563 | * | 4/2009 | ................ A63F 9/24 |
| WO | WO-2009114472 | | 9/2009 | |

OTHER PUBLICATIONS

"PCT Application No. PCT/US2009/036535 International Search Report", Apr. 17, 2009 , 3 pages.

U.S. Appl. No. 13/789,133 Final Office Action, filed Jan. 8, 2015, 7 Pages.

* cited by examiner

SELECTIVE FILTERING OF FEED PUBLICATION OF WAGERING GAME ACTIVITY

RELATED APPLICATIONS

This application claims the priority benefit of U.S. Provisional Application Ser. No. 61/529,551 filed Aug. 31, 2011

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including selective filtering of feed publication of wagering game activity.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
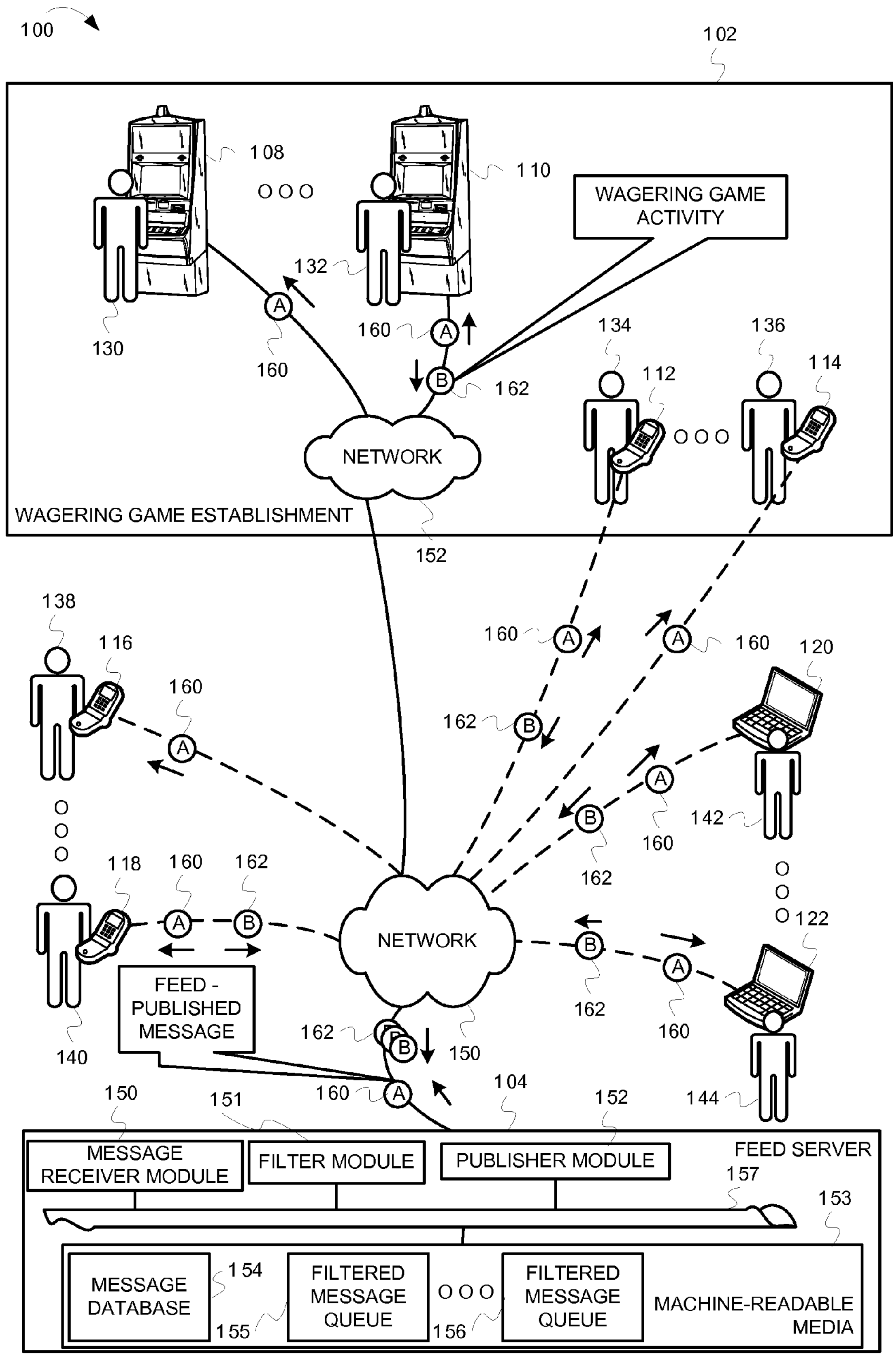
FIG. 1 depicts a system for filtering of messages related to wagering game activity for feed publication to wagering game players, according to some example embodiments.

This description of the embodiments is divided into seven sections. The first section provides an introduction to some example embodiments, while the second section provides various system environments. The third section describes some example displays of feed publications, and the fourth section describes example operations performed by some example embodiments. The fifth section describes an example wagering game machine architecture and network environment. The sixth section describes an example wagering game machine and the seventh section presents some general comments.

Introduction

This section provides an introduction to some example embodiments. Some example embodiments provide an intelligent and selective throttling of messages related to wagering game activity that are published or transmitted to various devices and accounts accessible by wagering game players. These various devices and accounts can include a wagering game machine at a wagering game establishment, a wagering game player account for online wagering game play, a mobile device, a wagering game player's email account, a wagering game player's social networking account, a wagering game player's microblogging account, etc.

Examples of published messages include notifications of a jackpot win, a progressive win, entering of a bonus round, etc. These jackpot and progressive wins can be based on a monetary amount above a certain threshold (e.g., $1000). These jackpot and progressive wins can also be based on a win multiplier. In particular, notification of a win can occur if the amount won is N (e.g., 100) times greater than the amount wagered.

In some example embodiments, different messages from a number of different wagering game activities by different wagering game players can be captured and stored. These different messages can then be selectively filtered and then published to different wagering game players. For example, wagering game player A can receive a first subset of the messages stored; wagering game player B can receive a second subset of the messages stored; etc. Also, the messages selected for publication can vary based on volume and types of messages captured and stored. For example, if the number of messages stored is less, messages that are considered to be at a lower level can be published. To illustrate, a message about a small jackpot win at a lesser known wagering game machine is more likely to be transmitted if other messages about bigger jackpot wins and better known wagering game machines are not captured and stored.

The published messages can be written messages that are displayed on a screen providing wagering game play, video showing the wagering game activity on the screen; audio output from speakers, etc. The wagering games about which messages are published can be slot machines, table games, etc.

The number and types of messages can be configurable. Also, the timing of the publication relative to the wagering game activity being described can be configurable (e.g., real time, delayed, etc.). In some example embodiments, either or both the operator of the wagering game or the wagering game player receiving these messages can configure the filtering of these messages. The operator can require that certain types of messages be published, while other types of messages can be optionally published. Accordingly in this example, the preferences of the wagering game player receiving the messages can determine which optional messages are to be received.

The wagering game player can also configure to receive messages about wagering game play from a specific wagering game player or group of wagering game players. For example, a wagering game player only receives messages about wagering game activity of their friends. The filtering of the messages to determine which messages are to be published to a wagering game player can be based on a number of different criteria. The filtering of the messages can be to specific wagering game players. The filtering of the messages can be about specific types of wagering game play (e.g., slot machine). The filtering of the messages can also be about wagering games having specific themes.

In some example embodiments, wagering game players configure future messages they are to receive by indicating a like or a dislike of current messages being received. For example, a wagering game player can select a given message and input a selection of a like or a dislike of the message. Based on this input by a particular wagering game player, future messages can be tailored for this wagering game player. For example, if the wagering game player indicates a dislike of a particular type of message (e.g., entry into bonus rounds), future messages are not provided for this particular type of message. Some example embodiments monitor a wagering game player's reaction to a message to determine the display of future messaging. For example, assume a current message indicates that wagering game player A won a jackpot on a wagering game with a theme X. If the wagering game player that received the current message begins playing the wagering game with a theme of X within a defined period (e.g., 5 minutes), future messages to this wagering game player can include jackpots won on a wagering game with the theme X.

In some example embodiments, these messages about wagering game activity are integrated with other types of messages, news feeds, etc. For example, these messages about wagering game activity can be integrated with chat sessions among wagering game players. Accordingly, the messages about wagering game activity can be integrated into a same display window for displaying of chat messages among the wagering game players.

Accordingly, the granularity of publication of these messages to a wagering game player vary based on a number of factors (e.g., past wagering game activities of the wagering game player receiving, the amount and type of wagering game activities presently occurring that generate messages, requirements of the operator of the wagering games, selections for type of messages to receive by the wagering game player, etc.). A published message can be an aggregation of information about a number of wagering game activities. For example, a message can be published that indicates that N wagering game players within a limited time period have each won more than Y monetary amount for the wagering game having theme Z.

System Environment

This section describes example system environments and presents structural aspects of some embodiments. This section includes example systems for filtering of messages related to wagering game activity for feed publication to wagering game players. This section will discuss FIGS. 1-3

The discussion of FIG. 1 will describe a system that provides activation events related to wagering game play base on at least one of participation of players, monetary amount and player points. The discussion of FIG. 2 will describe the system of FIG. 1 wherein a subset of the wagering game players receives an event invite. The discussion of FIG. 3 will describe the system of FIG. 1 wherein one wagering game player receives an event invite.

FIG. 1 depicts a system for filtering of messages related to wagering game activity for feed publication to wagering game players, according to some example embodiments. In particular, FIG. 1 depicts a system 100 that includes a feed server 104 that includes a message receiver module 150, a filter module 151, a publisher module 152 and machine-readable media 152 that are communicatively coupled together a communications bus 157. The message receiver module 150, the filter module 151, and the publisher module 152 can be software, firmware, hardware or a combination thereof. For example, the message receive module 150, the filter module 151, and the publisher module 152 can be software that is loaded into a processor for execution therein. The machine-readable media 153 stores a message database 154 and a number of filtered message queues (shown as a filtered message queue 155 through a filtered message queue 156.).

Figure 2:
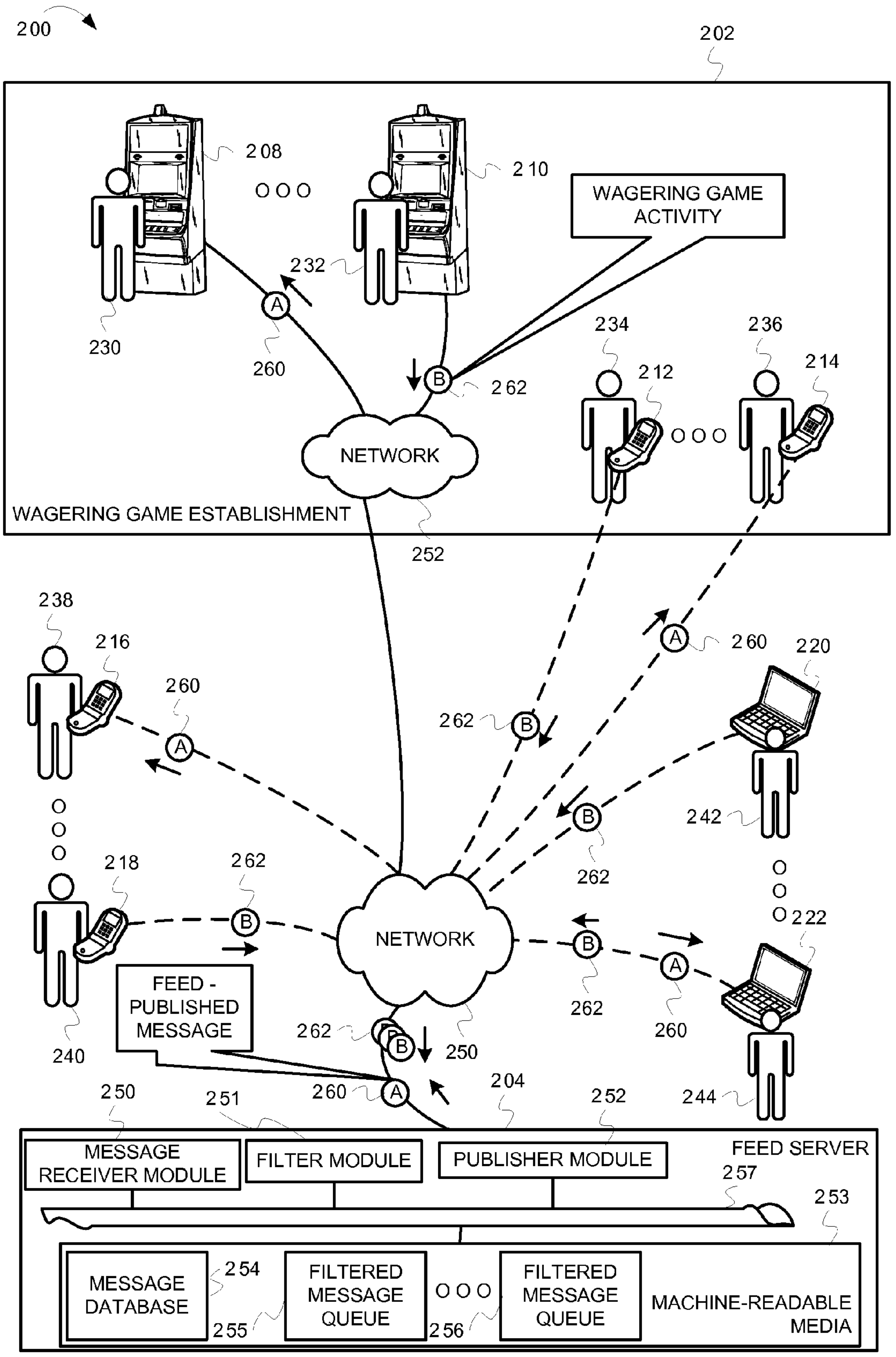
FIG. 2 depicts a system for filtering of messages related to wagering game activity for feed publication to a defined group of wagering game players, according to some example embodiments.
Figure 3:
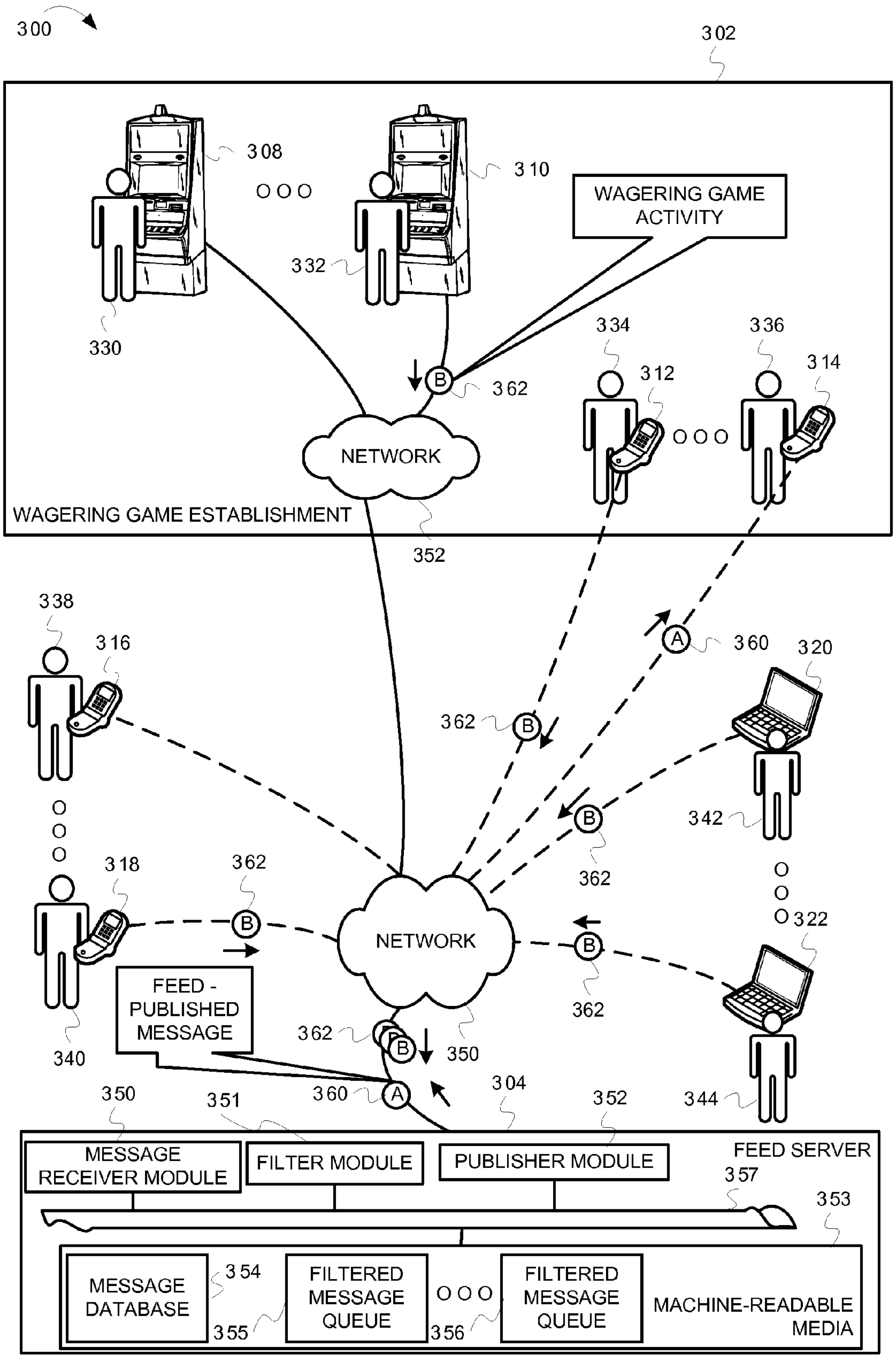
FIG. 3 depicts a system for filtering of messages related to wagering game activity for feed publication to a particular wagering game player, according to some example embodiments.

As further described below, the message receiver module 150 receives messages related to wagering game activity performed by wagering game players from a number of different locations (including wagering game machines, a device to provide online wagering game play, a mobile device, etc.). The message receiver module 150 stores these different messages in the message database 154. The filter module 151 filters the different messages in the message database 154 to create a subset of messages. As further described below, the filter module 151 can filter the different messages based on different criteria. Different criteria can create different subsets of messages. The filter module 151 can store a different subset of messages into one of the filtered message queues (155-156). In some example embodiments, a first subset of messages is stored in the filtered message queue 155 and published to a first group of wagering game players, a second subset of messages is stored in the filtered message queue 156 and published to a second group of wagering game players, etc. The publisher module 152 can take the different subsets of messages and publish such messages to the wagering game players that are configured to receive. In this example, this publication is shown as a published message 160 being transmitted over a network 150 to different devices communicatively coupled thereto. In this example, every wagering game player receives the published message. FIG. 2 and FIG. 3 described below provide publication to a group of wagering game players and to an individual wagering game player, respectively.

The feed server 104 is communicatively coupled to various devices which wagering game players use. The feed server 104 is communicatively coupled to the network 150.

The system 100 includes a wagering game establishment 102 that includes a number of wagering game machines (shown as a wagering game machine 108 through a wagering game machine 110). A wagering game player 130 is wagering on the wagering game machine 108, and a wagering game player 132 is wagering on the wagering game machine 110. The wagering game establishment 102 includes a network 152 that is communicatively coupled to the network 150. The feed server 104 is communicatively coupled to the wagering game machine 108 and the wagering game machine 110 through the network 150 and the network 152.

In some example embodiments, the message receiver module 150 and the publisher module 152 can communicate with wagering game players even though they are not currently wagering at a wagering game machine in a wagering game establishment. For example, wagering game players can be on devices that allow them to access their online wagering game account, their non-wagering game account, etc. In this example, these wagering game players are shown as a wagering game player 142 through a wagering game player 144. The wagering game player 142 is using a computer 120, and the wagering game player 144 is using the computer 122. For example, the wagering game player 142 can be logged into their player account for online wagering game play; while the wagering game player 144 can be logged into a different type of player account that is non-wagering but is related to wagering game activities.

The message receiver module 150 and the publisher module 152 can also communicate with wagering game players through their mobile devices. In this example, the system 100 illustrates wagering game players using mobile devices internal or external to the wagering game establishment 102. These different mobile devices used by wagering game players are communicatively coupled to the feed server 104 through the network 150. The different mobile devices may or may not be used for wagering game play. In these examples, the message receiver module 150 and the publisher module 152 can communicate with these mobile devices through emails, text messages, telephone calls, etc. In this example, the different mobile devices external to the wagering game establishment 102 are represented by a mobile device 116 through a mobile device 118. A wagering game player 138 is using the mobile device 116, and a wagering game player 140 is using the mobile device 118. The mobile devices 116-118 can be various distances from the wagering game establishment 102 (right outside, in a different city, in a different country, etc.). The different mobile devices internal to the wagering game establishment 102 are represented by a mobile device 112 through a mobile device 114. A wagering game player 134 is using the mobile device 112, and a wagering game player 136 is using the mobile device 114.

Accordingly, the message receiver module 150 can receive messages 162 (related to wagering game activity) from any of the devices described above that provide for wagering game activity by wagering game players and that are communicatively coupled to the feed server 104. In this example, the message receiver module 150 receives message 162 about wagering game activity from the wagering game machine 110; receives a different message 162 about different wagering game activity from the mobile device 112; receives a different message 162 about different wagering game activity from the computer 120; receives a different message 162 about different wagering game activity from the computer 122; and receives a different message 162 about different wagering game activity from the mobile device 118. The message receiver module 150 stores the messages 162 into the message database 154.

After filtering by the filter module 151, the publisher module 152 can publish subsets of messages (stored in the filtered message queues 155-156) to the different devices of the system 100. In this example, the publisher module 152 is publishing the published message 160 to each of the different devices in the system 100—the wagering game machine 108-110, the mobile devices 112-118, and the computers 120-122. In some example embodiments, the publisher module 152 can provide messages to the wagering game players through one or more of their player accounts. The player accounts can include a player account for wagering game play at the wagering game establishment 102, a player account at an online wagering game website, a player account for an online non-wagering game activity that can be related to wagering game play. Alternatively or in addition, the wagering game players can be notified of an event by emails, text messages, telephone calls, etc.

The wagering game players can also receive published messages through other non-wagering game related accounts—a wagering game player's social networking account, a wagering game player's microblogging account, etc. Examples of published messages include notifications of a jackpot win, a progressive win, entering of a bonus round, etc. These jackpot and progressive wins can be based on a monetary amount above a certain threshold (e.g., $1000). These jackpot and progressive wins can also be based on a win multiplier. In particular, notification of a win can occur if the amount won is N (e.g., 100) times greater than the amount wagered.

Also, the messages 160 selected for publication can vary based on volume and types of messages captured and stored. For example, if the number of messages stored is less, messages that are considered to be at a lower level can be published. To illustrate, a message about a small jackpot win at a lesser known wagering game machine is more likely to be transmitted if other messages about bigger jackpot wins and better known wagering game machines are not captured and stored.

Figure 4:
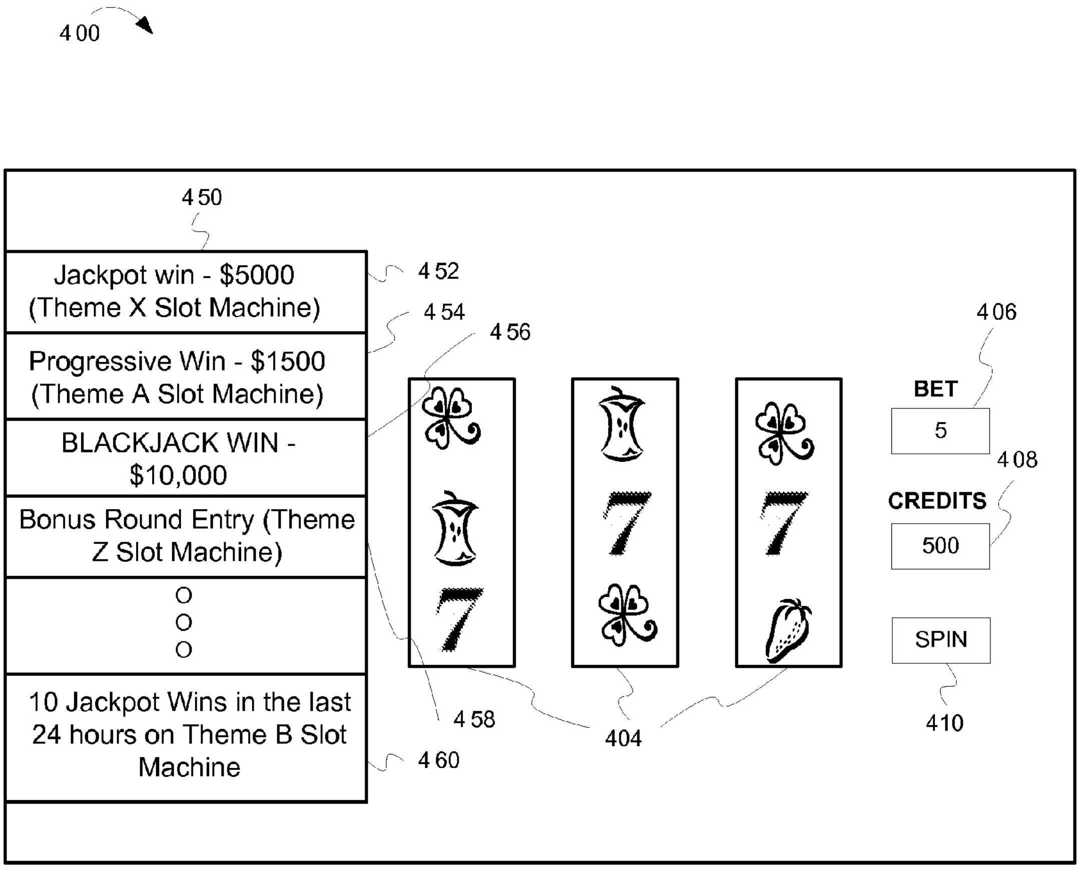
FIG. 4 depicts a screenshot of a device display displaying a feed of publication messages related to wagering game activity, according to some example embodiments.
Figure 5:
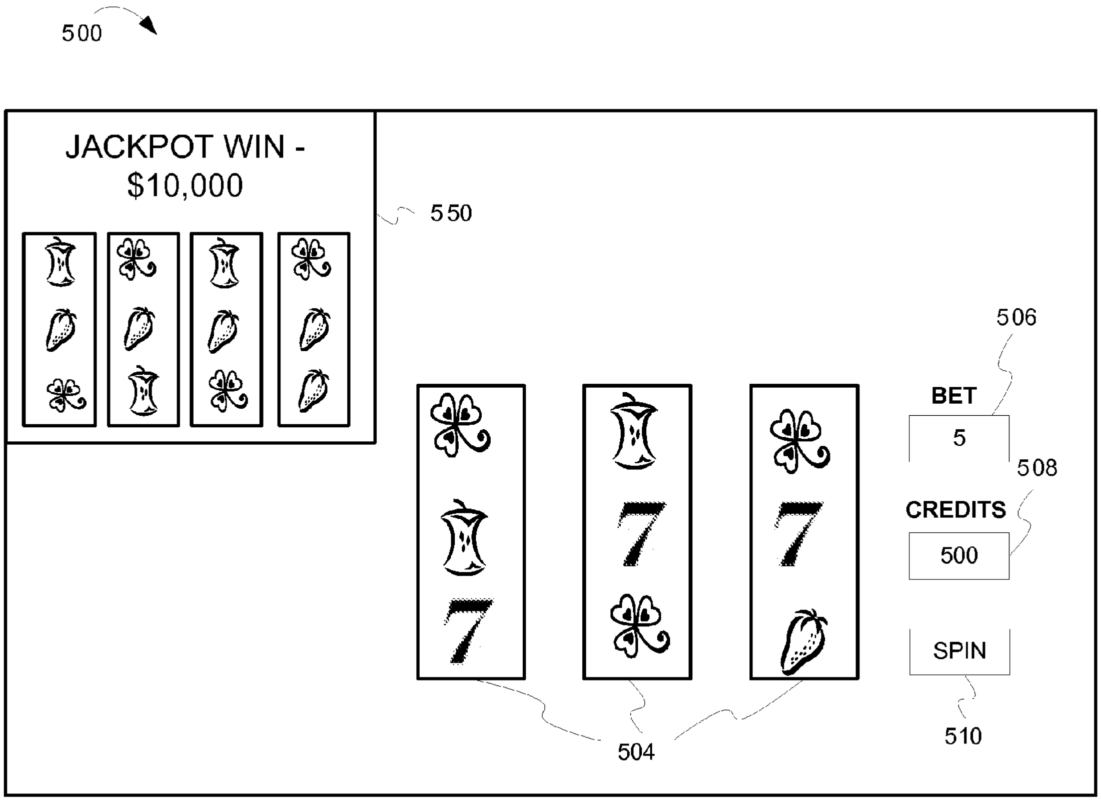
FIG. 5 depicts a screenshot of a device screen displaying a publication message related to wagering game activity in video form, according to some other example embodiments.

The published messages 160 can be written messages that are displayed on a screen providing wagering game play, video showing the wagering game activity on the screen; audio output from speakers, etc. The wagering games about which messages are published can be slot machines, table games, etc. Examples of the published messages 160 are illustrated in FIGS. 4-5, which are described below.

The number and types of messages for publication can be configurable. Also, the timing of the publication relative to the wagering game activity being described can be configurable (e.g., real time, delayed, etc.). In some example embodiments, either or both the operator of the wagering game or the wagering game player receiving these messages can configure the filtering of these messages. The operator can require that certain types of messages be published, while other types of messages can be optionally published. Accordingly in this example, the preferences of the wagering game player receiving the messages can determine which optional messages are to be received. In this example, the selection of the messages 160 to be published is based on a combination of a criteria defined by the operator and a criteria defined by the wagering game player receiving the messages. To illustrate, the operator of the wagering game play can require that all messages from a wagering game machine having theme A are required to be displayed (as part of some current advertising campaign for the wagering game machine having theme A). The wagering game player can also configure the messages to only receive jackpot wins above a given monetary amount. Therefore, the wagering game player would receive all messages from wagering game machines having theme A and only messages from other wagering games that have jackpot wins above the given monetary amount.

The wagering game player can also configure to receive messages about wagering game play from a specific wagering game player or group of wagering game players. For example, a wagering game player only receives messages about wagering game activity of their friends. In another example, a wagering game player only receives messages about wagering game activity of other wagering game players in a same age group. In another example, a wagering game player only receives messages about wagering game activity that occurred in a wagering game establishment where the wagering game player wagers, about wagering game activity that occurred in town or city where the wagering game player resides, etc. A wagering game player can be defined by an average amount wagered for a given time period (e.g., at least $1000/month). Accordingly, in another example, a wagering game player only receives messages about wagering game activity of other wagering game players that are in a same group relative to amount wagered for a given time period.

The filter module 151 can filter the messages to determine which messages are to be published to a wagering game player based on a number of different criteria. The filter module 151 can filter for publication to specific wagering game players. The filter module 151 can filter the messages such that the published messages 160 are about specific types of wagering game play (e.g., slot machine). The filter module 151 can filter the messages such that the published messages 160 are about wagering games having specific themes.

In some example embodiments, the wagering game players configure their player accounts for the messages to be received. Therefore, two different wagering game players can receive two different groups or subsets of messages. Accordingly, after a player logs into a wagering game machine at a wagering game establishment, logs into an online wagering game account, etc., the messages to this account can be based on these configurations set for the player account. The messages to a wagering game player can be configured based on their history of wagering game play, their status level of wagering game play, etc. For example, a message about a win by another wagering game player is only received if the win is at least N (e.g., 100) times the bet level in the past of the wagering game player receiving the message. Their bet level for the past can be based on an average over a number of previous betting sessions (e.g., the previous 20), on the previous betting session, etc.

In some example embodiments, wagering game players configure future messages they are to receive by indicating a like or a dislike of current published messages 160 being received. For example, a wagering game player can select a given message 160 and input a selection of a like or a dislike of the message 160. Based on this input by a particular wagering game player, future messages can be tailored for this wagering game player. For example, if the wagering game player indicates a dislike of a particular type of message (e.g., entry into bonus rounds), future messages are not provided for this particular type of message. Some example embodiments monitor a wagering game player's reaction to a message to determine the display of future messaging. For example, assume a current message indicates that wagering game player A won a jackpot on a wagering game with a theme X. If the wagering game player that received the current message begins playing the wagering game with a theme of X within a defined period (e.g., 5 minutes), future messages to this wagering game player can include jackpots won on a wagering game with the theme X.

In some example embodiments, the published messages 160 can include indicators of winning trends for one or more wagering games. For example, different colors can represent different winning trends. For example, if the game is "hot" (paying above a certain amount within a defined period) the color can be red; if the game is "cold" (paying below a certain amount within a defined period) the color can be blue, etc.

In some example embodiments, the published messages 160 about wagering game activity are integrated with other types of messages, news feeds, etc. For example, the published messages 160 can be integrated with chat sessions among wagering game players. Accordingly, the published messages 160 about wagering game activity can be integrated into a same display window for displaying of chat messages among the wagering game players. The published messages 160 can also be integrated with messages about local news, national news, stock market activity, sport scores, etc. This integration with other types of messages can affect the selection of messages to be published to the wagering game players. For example, the number of the published messages 160 can be reduced if the other types of messages are being increased.

Accordingly, the granularity of publication of the published messages 160 to a wagering game player vary based on a number of factors (e.g., past wagering game activities of the wagering game player receiving, the amount and type of wagering game activities presently occurring that generate messages, requirements of the operator of the wagering games, selections for type of messages to receive by the wagering game player, etc.).

The published messages 160 can be an aggregation of information about a number of wagering game activities. For example, the published messages 160 can be published that indicates that N wagering game players within a limited time period have each won more than Y monetary amount for the wagering game having theme Z. To illustrate, the published messages 160 can be published that indicates that 10 wagering game player have won more than $500 in the last two hours. The publication of the published messages 160 can also be based on the number of wagering game players playing a particular type of wagering game. For example, if the number of wagering game players playing a wagering game having theme X exceeds a threshold, then the messages from this particular wagering game is published. In such a configuration, there is a greater likelihood of having a large amount of messages about jackpot wins, entry into bonus rounds, etc. for the wagering game having them X in short time period because a large number of wagering game players are playing. Another example of an aggregated published message includes messages from a group of wagering game establishments. For example, the published messages 160 can indicate that 50 wagering game players have had a jackpot win exceeding $1000 in the last two weeks at casino X.

In some example embodiments, the published messages 160 are published based on payment of a fee. For example, the entity that developed a wagering game having a theme P would pay a fee to the operator of the wagering games to ensure that jackpot or progressive wins above a certain monetary amount are published.

The published messages 160 can include the location where the wagering game activity occurred. For example, the published messages 160 can indicate that 10 wagering game players in the city where the wagering game player receiving the published messages 160 is currently located have each won over $500 dollars in the last week. In another example, the published messages 160 can identify the specific wagering game establishment and the location of the wagering game machine therein where the activity occurred. Accordingly, the published messages 160 can be targeted to wagering game players based on their location and the location of the wagering game activity.

The published messages 160 can also be based on having available wagering game machines for wagering game play. For example, assume that in a wagering game establishment there are 10 wagering game machines with theme Z that are not currently occupied but available. Notifications about wagering game play at wagering game machines with theme Z would be published in order to encourage other wagering game players to begin wagering game play at wagering game machines with theme Z. These notifications can be published to those wagering game players that are in or near the wagering game establishment with the available wagering game machines. For example, based on GPS tracking applications of mobile devices of the wagering game players, the wagering game players that are in or near wagering game establishment but are not currently logged in their account at a wagering game machine can receive these published messages. In the system 100, the wagering game players 134-136 would receive the published messages.

In some example embodiments, wagering game players that have achieved a certain level of wagering game play are treated differently with regard to the published messages 160. A level for a wagering game player can be based on different criteria (e.g., amount wagered over time, length of time the player has been wagering, etc.). For example, a wagering game player that has wagered more is at a higher level than a wagering game player that has wagered less. These wagering game players that have achieved certain levels are given more configurability about what messages they receive. As an example, these wagering game players can block more types of messages because they have achieved this certain level of wagering game play. Alternatively or in addition, only these wagering game players that have achieved a certain level receive certain types of messages or received prior to other wagering game players receiving.

Notifications provided by the published messages 160 can also relate to leader boards for wagering game play of wagering game players. For example, notification is published after a wagering game player breaks into the top 10 of a leader board for amount won for a specific wagering game for a given time period.

Publication of the published messages 160 can be specific to the time of day. For example, a wagering game player does not receive any messages about wagering game activity until after 5 pm weekday, only on weekends, etc. In some example embodiments, the wagering game player can configure the messages such that during this period when messages are not being published, the top N messages are identified. When the wagering game player authorizes receipt of the published messages 160 at a later time, these top N messages can be transmitted to the wagering game player (e.g., to their mobile device, one or more of the accounts (email, microblogging, etc.)). For example, messages that notify of the top 10 jackpot wins from 8 am-5 pm during the weekdays are transmitted to the wagering game player after 5 pm. In some example embodiments, publication of the published messages 160 is based on popular topic trends on a microblogging application. For example, messages from the top 10 wagering games being discussed on a microblogging application can be published.

In some example embodiments, the wagering game player receiving the published message 160 can (upon receipt) select the message to be given a number of options to the wagering game player. For example, the published messages 160 can be associated with a hyperlink to selection for these options. One option can include viewing a video replay of the wagering game activity and/or listening to an audio replay of the wagering game activity. For example, the publisher module 152 can download the video or audio in response to selection of the published message 160. Another option can include allowing the wagering game player to send a message to the wagering game player that created the wagering game activity. For example, if the wagering game activity is a win, the wagering game player can send a congratulatory message. If the wagering game activity is related to a wagering game being played at an online wagering game website, the wagering game player receiving the message can also be given the option to play the wagering game described in the message. A similar option can be available for wagering games at the wagering game establishment 102 wherein wagering games can be downloaded by the wagering game player. In particular, the wagering game player receiving the message at one of the wagering game machine 108-110 can also be given the option to download and play the wagering game described in the message. A similar option can be available for wagering games being playable on mobile devices 112-118. In particular, assume the wagering game player receives a text message, email, etc. that includes this message at their mobile device. The wagering game player can be given the option to download and play the wagering game described in the message at their mobile device or play (if already downloaded) the wagering game at their mobile device.

In some example embodiments, the filter module 151 can be configured to a limit on how frequently to publish a particular type of message. For example, entry into a bonus round for a wagering game having theme A by any wagering game player is only published once every hour. Accordingly, the filter module 151 can be prevented from placing two of the same or similar messages in one of the filtered message queues 155-156 near or next to each other (based on how frequent the messages are published in the filtered message queues 155-156).

The filter module 151 can filter the messages based on types of wagering games. For example, only messages related to slot machines are published; only messages related to table games (e.g., blackjack, roulette, etc.) are published; only messages related to specific slot machine or specific table tables, etc. Also, the type of message published for a particular wagering game activity can vary based on where the message is being published. For example, if the message is being published to a video application, the message can be a video; if the message is being published to a microblogging application, the message can be text or a screenshot; etc.

In some example embodiments, the published messages 160 are related to wagering game activity from only an online wagering game website; from only a particular wagering game establishment; from only a defined group of wagering game establishment; from all wagering game establishments in a city or town; etc. In some example embodiments, the published messages 160 are related to wagering game activity from both an online wagering game website and one or more wagering game establishments. In some example embodiments, the published messages 160 related to wagering game activity from both an online wagering game website and one or more wagering game establishments can be customized depending on the types of wagering games at the one or more wagering game establishments. For example, assume that the message receiver module 150 receives a message 162 related to wagering game activity from a wagering game having theme X and played at an online wagering game website from the computer 120. If the wagering game establishment 102 does not have a wagering game having theme X, then the wagering game players at the wagering game establishment 102 do not receive the published message 160. Alternatively, this particular message can be placed into the filtered message queues 155-156 for these particular wagering game players but be given a lower priority for publication in comparison to messages related to wagering games that are available at the wagering game establishment 102.

The filter module 151 can also filter the messages based on factors that are external to the wagering game activities. These external factors can include the time of day, the particular day, the particular month, etc. For example, the threshold for the monetary amount or multiplier relative to the amount wagered for a jackpot win to be published can be increased at certain times of day and decreased at other times of the day. To illustrate, in order for a wagering game activity to be published from 8 pm to 1 am (in other words, placed into the filtered message queue by the filter module 151), the threshold for a monetary amount for a jackpot win is required to be at least $5000. Any other time of day, this threshold is reduced to $500.

FIG. 2 depicts a system for filtering of messages related to wagering game activity for feed publication to a defined group of wagering game players, according to some example embodiments. In contrast to the system 100 of FIG. 1 where the published messages 160 were received by all of the different wagering game players, for a system 200 of FIG. 2 published messages 260 are published to a defined group of wagering game players. For example, some wagering game players can configure the filtering of the messages such that messages related to wagering game activity are by friends. Friends associations among the wagering game players can be defined relative to a social network, within the system 200, etc.

FIG. 2 depicts the system 200 that includes a feed server 204 that includes a message receiver module 250, a filter module 251, a publisher module 252 and machine-readable media 252 that are communicatively coupled together a communications bus 257. The message receiver module 250, the filter module 251, and the publisher module 252 can be software, firmware, hardware or a combination thereof. For example, the message receiver module 250, the filter module 251, and the publisher module 252 can be software that is loaded into a processor for execution therein. The machine-readable media 253 stores a message database 254 and a number of filtered message queues (shown as a filtered message queue 255 through a filtered message queue 256.).

The message receiver module 250 receives messages related to wagering game activity performed by wagering game players from a number of different locations (including wagering game machines, a device to provide online wagering game play, a mobile device, etc.). The message receiver module 250 stores these different messages in the message database 254. The filter module 251 filters the different messages in the message database 254 to create a subset of messages. In this example at least one of the criteria is that the messages are published to a defined group of wagering game players (e.g., friends of the player who performed the wagering game activity). The filter module 251 can also filter the different messages based on other criteria (as described above). Different criteria can create different subsets of messages. The filter module 251 can store a different subset of messages into one of the filtered message queues (255-256). In some example embodiments, a first subset of messages is stored in the filtered message queue 255 and published to a first defined group of wagering game players, a second subset of messages is stored in the filtered message queue 256 and published to a second defined group of wagering game players, etc. The publisher module 252 can take the different subsets of messages and publish such messages to the wagering game players that are configured to receive. In this example, this publication is shown as a published message 260 being transmitted over a network 250 to different devices communicatively coupled thereto.

The feed server 204 is communicatively coupled to various devices which wagering game players use. The feed server 204 is communicatively coupled to the network 250. The system 200 includes a wagering game establishment 202 that includes a number of wagering game machines (shown as a wagering game machine 208 through a wagering game machine 210). A wagering game player 230 is wagering on the wagering game machine 208, and a wagering game player 232 is wagering on the wagering game machine 210. The wagering game establishment 202 includes a network 252 that is communicatively coupled to the network 250. The feed server 204 is communicatively coupled to the wagering game machine 208 and the wagering game machine 210 through the network 250 and the network 252.

In some example embodiments, the message receiver module 250 and the publisher module 252 can communicate with wagering game players even though they are not currently wagering at a wagering game machine in a wagering game establishment. For example, wagering game players can be on devices that allow them to access their online wagering game account, their non-wagering game account, etc. In this example, these wagering game players are shown as a wagering game player 242 through a wagering game player 244. The wagering game player 242 is using a computer 220, and the wagering game player 244 is using the computer 222. For example, the wagering game player 242 can be logged into their player account for online wagering game play; while the wagering game player 244 can be logged into a different type of player account that is non-wagering but is related to wagering game activities.

The message receiver module 250 and the publisher module 252 can also communicate with wagering game players through their mobile devices. In this example, the system 200 illustrates wagering game players using mobile devices internal or external to the wagering game establishment 202. These different mobile devices used by wagering game players are communicatively coupled to the feed server 204 through the network 250. The different mobile devices may or may not be used for wagering game play. In these examples, the message receiver module 250 and the publisher module 252 can communicate with these mobile devices through emails, text messages, telephone calls, etc. In this example, the different mobile devices external to the wagering game establishment 202 are represented by a mobile device 216 through a mobile device 218. A wagering game player 238 is using the mobile device 216, and a wagering game player 240 is using the mobile device 218. The mobile devices 216-218 can be various distances from the wagering game establishment 202 (right outside, in a different city, in a different country, etc.). The different mobile devices internal to the wagering game establishment 202 are represented by a mobile device 212 through a mobile device 214. A wagering game player 234 is using the mobile device 212, and a wagering game player 236 is using the mobile device 214.

Accordingly, the message receiver module 250 can receive messages 262 (related to wagering game activity) from any of the devices described above that provide for wagering game activity by wagering game players and that are communicatively coupled to the feed server 204. In this example, the message receiver module 250 receives message 262 about wagering game activity from the wagering game machine 210; receives a different message 262 about different wagering game activity from the mobile device 212; receives a different message 262 about different wagering game activity from the computer 220; receives a different message 262 about different wagering game activity from the computer 222; and receives a different message 262 about different wagering game activity from the mobile device 218. The message receiver module 250 stores the messages 262 into the message database 254.

After filtering by the filter module 251, the publisher module 252 can publish subsets of messages (stored in the filtered message queues 255-256) to the different devices of the system 200. In this example, the publisher module 252 is publishing the published message 260 to a defined group of wagering game players—the wagering game player 230 at the wagering game machine 208, the wagering game player 236 at their mobile device 214, and the wagering game player 244 at the computer 222. In some example embodiments, the publisher module 252 can provide messages to the wagering game players through one or more of their player accounts. The player accounts can include a player account for wagering game play at the wagering game establishment 202, a player account at an online wagering game website, a player account for an online nonwagering game activity that can be related to wagering game play. Alternatively or in addition, the wagering game players can be notified of an event by emails, text messages, telephone calls, etc.

FIG. 3 depicts a system for filtering of messages related to wagering game activity for feed publication to a particular wagering game player, according to some example embodiments. In contrast to the system 100 of FIG. 1 where the published messages 160 were received by all of the different wagering game players and the system 200 of FIG. 2 where the published messages 260 were received by a defined group of wagering game players, for a system 300 of FIG. 3 published messages 360 are published to a particular wagering game player.

FIG. 3 depicts the system 300 that includes a feed server 304 that includes a message receiver module 350, a filter module 351, a publisher module 352 and machine-readable media 352 that are communicatively coupled together a communications bus 357. The message receiver module 350, the filter module 351, and the publisher module 352 can be software, firmware, hardware or a combination thereof. For example, the message receive module 350, the filter module 351, and the publisher module 352 can be software that is loaded into a processor for execution therein. The machine-readable media 353 stores a message database 354 and a number of filtered message queues (shown as a filtered message queue 355 through a filtered message queue 356.).

The message receiver module 350 receives messages related to wagering game activity performed by wagering game players from a number of different locations (including wagering game machines, a device to provide online wagering game play, a mobile device, etc.). The message receiver module 350 stores these different messages in the message database 354. The filter module 351 filters the different messages in the message database 354 to create a subset of messages. In this example at least one of the criteria is that the messages are published to a defined group of wagering game players (e.g., friends of the player who performed the wagering game activity). The filter module 351 can also filter the different messages based on other criteria (as described above). Different criteria can create different subsets of messages. The filter module 351 can store a different subset of messages into one of the filtered message queues (355-356). In some example embodiments, a first subset of messages is stored in the filtered message queue 355 and published to a first defined group of wagering game players, a second subset of messages is stored in the filtered message queue 356 and published to a second defined group of wagering game players, etc. The publisher module 352 can take the different subsets of messages and publish such messages to the wagering game players that are configured to receive. In this example, this publication is shown as a published message 360 being transmitted over a network 350 to the device associated with a particular wagering game player configured to receive the published messages (the wagering game player 336 associated with the mobile device 314).

The feed server 304 is communicatively coupled to various devices which wagering game players use. The feed server 304 is communicatively coupled to the network 350. The system 300 includes a wagering game establishment 302 that includes a number of wagering game machines (shown as a wagering game machine 308 through a wagering game machine 310). A wagering game player 330 is wagering on the wagering game machine 308, and a wagering game player 332 is wagering on the wagering game machine 310. The wagering game establishment 302 includes a network 352 that is communicatively coupled to the network 350. The feed server 304 is communicatively coupled to the wagering game machine 308 and the wagering game machine 310 through the network 350 and the network 352.

In some example embodiments, the message receiver module 350 and the publisher module 352 can communicate with wagering game players even though they are not currently wagering at a wagering game machine in a wagering game establishment. For example, wagering game players can be on devices that allow them to access their online wagering game account, their non-wagering game account, etc. In this example, these wagering game players are shown as a wagering game player 342 through a wagering game player 344. The wagering game player 342 is using a computer 320, and the wagering game player 344 is using the computer 322. For example, the wagering game player 342 can be logged into their player account for online wagering game play; while the wagering game player 344 can be logged into a different type of player account that is non-wagering but is related to wagering game activities.

The message receiver module 350 and the publisher module 352 can also communicate with wagering game players through their mobile devices. In this example, the system 300 illustrates wagering game players using mobile devices internal or external to the wagering game establishment 302. These different mobile devices used by wagering game players are communicatively coupled to the feed server 304 through the network 350. The different mobile devices may or may not be used for wagering game play. In these examples, the message receiver module 350 and the publisher module 352 can communicate with these mobile devices through emails, text messages, telephone calls, etc. In this example, the different mobile devices external to the wagering game establishment 302 are represented by a mobile device 316 through a mobile device 318. A wagering game player 338 is using the mobile device 316, and a wagering game player 340 is using the mobile device 318. The mobile devices 316-318 can be various distances from the wagering game establishment 302 (right outside, in a different city, in a different country, etc.). The different mobile devices internal to the wagering game establishment 302 are represented by a mobile device 312 through a mobile device 314. A wagering game player 334 is using the mobile device 312, and a wagering game player 336 is using the mobile device 314.

Accordingly, the message receiver module 350 can receive messages 362 (related to wagering game activity) from any of the devices described above that provide for wagering game activity by wagering game players and that are communicatively coupled to the feed server 304. In this example, the message receiver module 350 receives message 362 about wagering game activity from the wagering game machine 310; receives a different message 362 about different wagering game activity from the mobile device 312; receives a different message 362 about different wagering game activity from the computer 320; receives a different message 362 about different wagering game activity from the computer 322; and receives a different message 362 about different wagering game activity from the mobile device 318. The message receiver module 350 stores the messages 362 into the message database 354.

After filtering by the filter module 351, the publisher module 352 can publish subsets of messages (stored in the filtered message queues 355-356) to the different devices of the system 300. In this example, the publisher module 352 is publishing the published message 360 to a particular wagering game player—the wagering game player 336 at the mobile device 314. In some example embodiments, the publisher module 352 can provide messages to the wagering game players through one or more of their player accounts. The player accounts can include a player account for wagering game play at the wagering game establishment 302, a player account at an online wagering game website, a player account for an online nonwagering game activity that can be related to wagering game play. Alternatively or in addition, the wagering game players can be notified of an event by emails, text messages, telephone calls, etc.

Example Displays of Feed Publications

This section describes some example displays of the feed publications of the published messages transmitted to the wagering game players.

FIG. 4 depicts a screenshot of a device display displaying a feed of publication messages related to wagering game activity, according to some example embodiments. In particular, FIG. 4 depicts a screenshot of a display 400 of a device providing wagering game play by wagering game players. For example with reference to FIG. 1, the display 400 can be a display for any of the wagering game machines 108-110, the computers 120-122, and the mobile devices 112-118.

The display 400 includes reels 404 that are part of a slot wagering game play. The display 400 also includes a window 406 to display the amount being wagered for a spin of the reels 404. A window 408 displays the amount of game credit that the wagering game player has available on the device. A button 410 is selectable by the wagering game player to initiate wagering game play by spinning of the reels 404.

The display 404 includes a feed publication window 450 that is integrated into the display of the components for wagering game play (described above). Accordingly, the wagering game player can view published messages in the feed publication window 450 while continuing wagering game play. The feed publication window 450 is to display published messages received from the publisher module 156 (see FIG. 1). In this example, the published messages are in text form. A first published message 452 provides notification that there was a jackpot win of $5000 at a slot machine with a theme X. A second published message 454 provides notification that there was a progressive win of $1500 at a slot machine with a theme A. A third published message 456 provides notification that there was a table game win (blackjack) of $10,000. A fourth published message 458 provides notification that there was an entry into a bonus round at a slot machine with a theme Z. A fifth published message 460 is an aggregation published message. In particular, this message is an aggregation of multiple messages about wagering game activity that are received by the message receiver module (see FIG. 1). As described above, the filter module can aggregate messages that have a same or similar attribute to create a single message for publication. In this example, the message receiver module (see FIG. 1) receives 10 different messages about 10 different jackpot wins. The filter module can then create a message regarding these 10 different jackpot wins. In this example, the fifth published message 460 provides notification that there were 10 jackpot wins in the last 24 hours at a slot machine with a theme B.

These publication messages can be displayed as they are received from the publisher module. In particular, the filtered message queues can be First In First Out (FIFO) queues, wherein the publisher module publishes the messages in a FIFO order. In this example, the first published message 452 is received and displayed first; the second published message 454 is received and displayed second; the third published message 456 is received and displayed third; the fourth published message 458 is received and displayed fourth; and the fifth published message 460 is received and displayed fifth.

The published messages can also be displayed in other forms. To illustrate, FIG. 5 depicts a screenshot of a device screen displaying a publication message related to wagering game activity in video form, according to some other example embodiments. In contrast to FIG. 4, FIG. 5 includes a display 500 wherein the publication message is displayed as a video replay of a wagering game activity. In particular, the display 500 includes a feed publication window 550 that display a video replay of a wagering game activity. Accordingly, instead of receiving a text form message, a video replay is received. The message receiver module receives the video replay, which is subsequently published by the publication module (as described above). In this example, the video replay is a replay of a jackpot win of $10,000.

Similar to FIG. 4, the feed publication window 550 is integrated with the display of the wagering game play by the wagering game player receiving the published message. The display 500 includes reels 504 that are part of a slot wagering game play. The display 500 also includes a window 506 to display the amount being wagered for a spin of the reels 504. A window 508 displays the amount of game credit that the wagering game player has available on the device. A button 510 is selectable by the wagering game player to initiate wagering game play by spinning of the reels 504.

As described above, the published messages are not limited to display that includes wagering game play. For example, the publication messages can be published to the wagering game player's accounts (e.g., email, microblogging, social networking, etc.). The publication messages can also be posted as video on a video-sharing website.

Example Operations

This section describes operations associated with some example embodiments. In the discussion below, the flowchart will be described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 6:
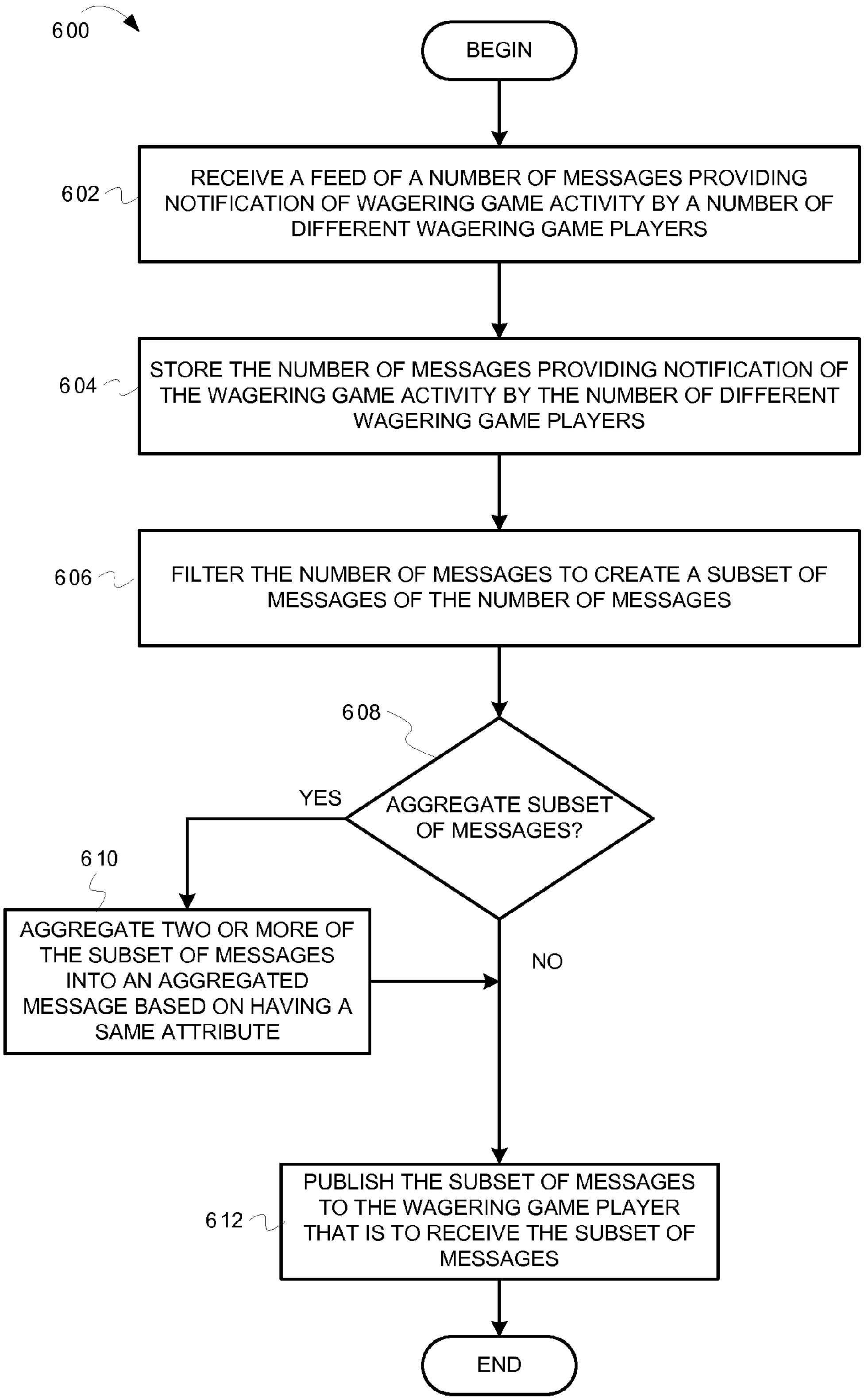
FIG. 6 depicts a flowchart for filtering and publication of messages related to wagering game activity, according to some example embodiments.

The section will discuss FIG. 6. FIG. 6 depicts a flowchart for filtering and publication of messages related to wagering game activity, according to some example embodiments. The operations of a flowchart 600 are described in reference to FIG. 1. The operations of the flowchart 600 begin at block 602.

At block 602, the message receiver module 150 receives a feed of a number of messages providing notification of wagering game activity by a number of different wagering game players. With reference to FIG. 1, the message receiver module 150 receives the messages 162 from different devices in the system 100. Operations of the flowchart 600 continue at block 604.

At block 604, the message receiver module 150 stores the number of messages providing notification of the wagering game activity by the number of different wagering game players. With reference to FIG. 1, the message receiver module 150 stores the messages 162 into the message database 154. Operations of the flowchart 600 continue at block 606.

At block 606, the filter module 151 filters the number of messages to create a subset of messages of the number of messages. With reference to FIG. 1, the filter module 151 filters the messages 154 to create a subset of messages that are stored in the filtered message queues 155-156 based on one or more of the criteria described above. Operations of the flowchart 600 continue at block 608.

At block 608, the filter module 151 determines whether to aggregate at least some of the messages in the subset of messages. As described above, the filter module 151 can aggregate two or more messages to create a single message that is then published. The two or more messages can share a common attribute. For example, the published messages 160 can be published that indicates that N wagering game players within a limited time period have each had a jackpot win for the wagering game having theme Z. To illustrate, the published messages 160 can be published that indicates that 10 wagering game player have won more than $1000 in the last week. Another example of an aggregated published message includes messages from a group of wagering game establishments. For example, the published messages 160 can indicate that 50 wagering game players have had a progressive win exceeding $500 in the last week at casino B. The determination of whether to aggregate can be a configurable option that can be set. For example, an operator of the wagering game play or the wagering game player receiving the publication messages can set aggregation for certain types of messages. If at least some of the messages in the subset of messages are aggregated, operations of the flowchart 600 continue at block 610. Otherwise, operations of the flowchart 600 continue at block 612.

At block 610, the filter module 151 aggregates two or more of the subset of messages into an aggregated message based on having a same attribute. With reference to FIG. 1, the filter module 151 can create an aggregated publication message that is stored in one of the filtered message queues 155-156. The aggregated publication message can be derived from two or more of the messages 162 received by the message receiver module 150. Operations of the flowchart 600 continue at block 612.

At block 612, the publisher module 152 publishes the subset of messages to the wagering game player that is to receive the subset of messages. With reference to FIG. 1, the publisher module 152 publishes the published messages 160 to the wagering game players. Operations of the flowchart 600 are complete.

Wagering Game Machine Architecture and Network Environment

This section describes an example wagering game architecture and network environment of some example embodiments.

Wagering Game Machine Architecture

Figure 7:
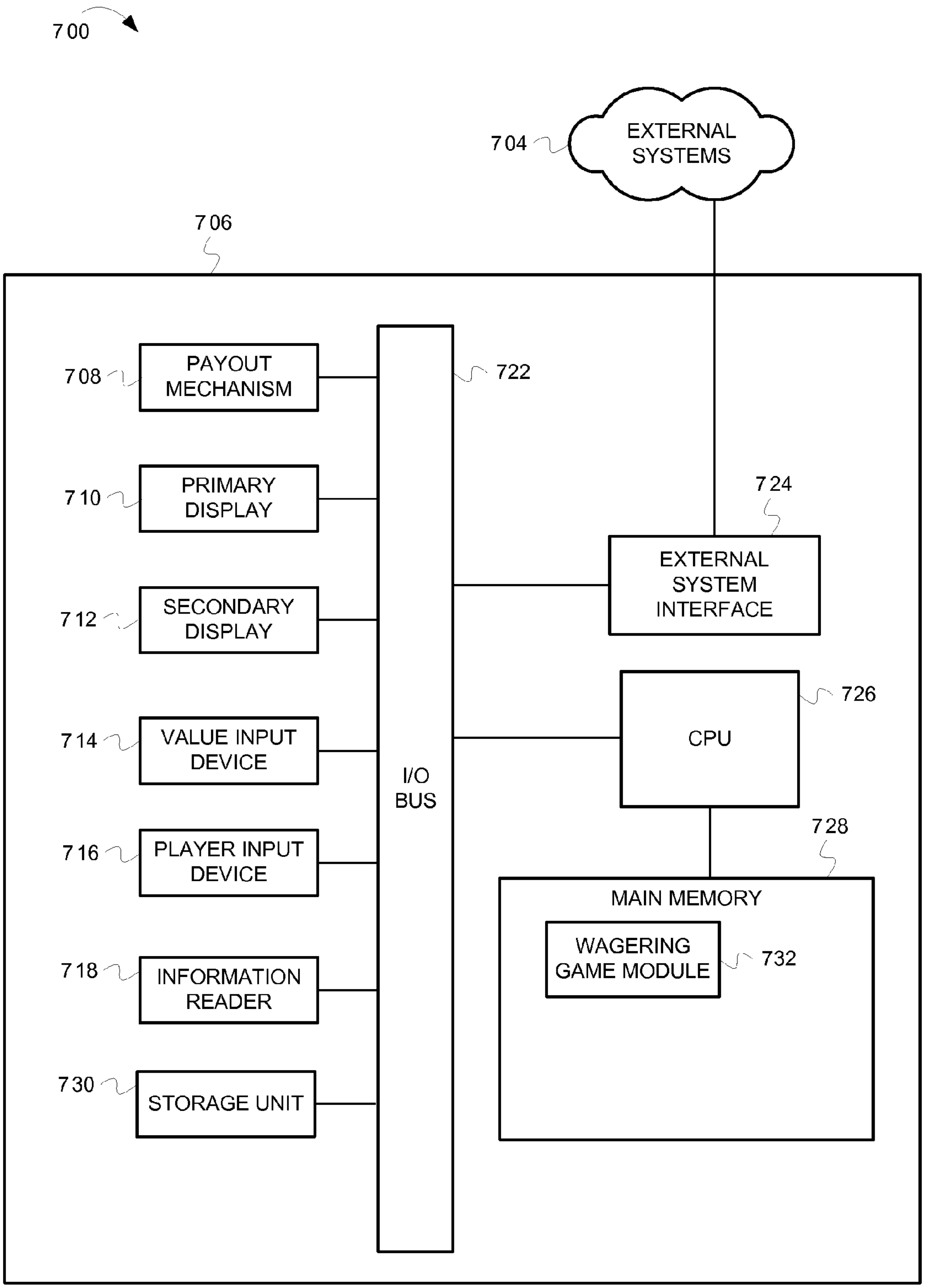
FIG. 7 depicts a block diagram illustrating a wagering game machine architecture, according to some example embodiments.

FIG. 7 depicts a block diagram illustrating a wagering game machine architecture, according to some example embodiments. As shown in FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game module 732. In one embodiment, the wagering game module 732 can present wagering games, such as video poker, video black jack, video slots, video lottery, etc., in whole or part. The wagering game module 732 can also display the feed publication related to wagering game activity (as described above).

The CPU 726 is also connected to an input/output (I/O) bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks).

In one embodiment, the wagering game machine 706 can include additional peripheral devices and/or more than one of each component shown in FIG. 7. For example, in one embodiment, the wagering game machine 706 can include multiple external system interfaces 724 and/or multiple CPUs 726. In one embodiment, any of the components can be integrated or subdivided.

Any component of the architecture 700 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 7 describes an example wagering game machine architecture, this section continues with a discussion wagering game networks.

Wagering Game Network

Figure 8:
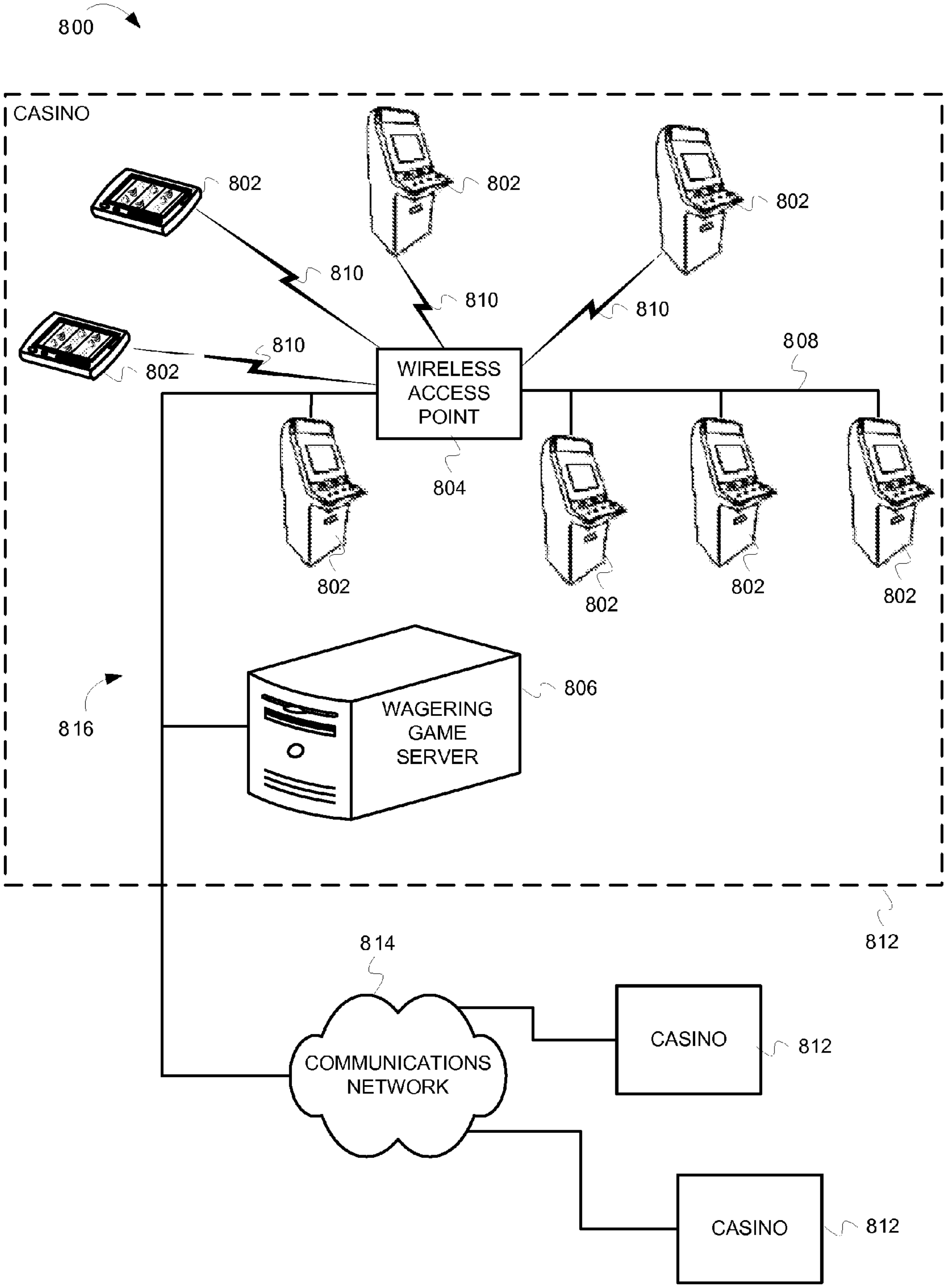
FIG. 8 depicts a block diagram illustrating a wagering game network 800, according to some example embodiments.

FIG. 8 depicts a block diagram illustrating a wagering game network 800, according to some example embodiments. As shown in FIG. 8, the wagering game network 800 includes a plurality of casinos 812 connected to a communications network 814.

Each casino 812 includes a local area network 816, which includes an access point 804, a wagering game server 806, and wagering game machines 802. The access point 804 provides wireless communication links 810 and wired communication links 808. The wired and wireless communication links can employ any suitable connection technology, such as Bluetooth, 802.11, Ethernet, public switched telephone networks, SONET, etc. In some embodiments, the wagering game server 806 can serve wagering games and distribute content to devices located in other casinos 812 or at other locations on the communications network 814.

The wagering game machines 802 described herein can take any suitable form, such as floor standing models, handheld mobile units, bartop models, workstation-type console models, etc. Further, the wagering game machines 802 can be primarily dedicated for use in conducting wagering games, or can include non-dedicated devices, such as mobile phones, personal digital assistants, personal computers, etc. In one embodiment, the wagering game network 800 can include other network devices, such as accounting servers, wide area progressive servers, player tracking servers, and/or other devices suitable for use in connection with embodiments of the invention.

In some embodiments, wagering game machines 802 and wagering game servers 806 work together such that a wagering game machine 802 can be operated as a thin, thick, or intermediate client. For example, one or more elements of game play may be controlled by the wagering game machine 802 (client) or the wagering game server 806 (server). Game play elements can include executable game code, lookup tables, configuration files, game outcome, audio or visual representations of the game, game assets or the like. In a thin-client example, the wagering game server 806 can perform functions such as determining game outcome or managing assets, while the wagering game machine 802 can present a graphical representation of such outcome or asset modification to the user (e.g., player). In a thick-client example, the wagering game machines 802 can determine game outcomes and communicate the outcomes to the wagering game server 806 for recording or managing a player's account.

In some embodiments, either the wagering game machines 802 (client) or the wagering game server 806 can provide functionality that is not directly related to game play. For example, account transactions and account rules may be managed centrally (e.g., by the wagering game server 806) or locally (e.g., by the wagering game machine 802). Other functionality not directly related to game play may include power management, presentation of advertising, software or firmware updates, system quality or security checks, etc.

Any of the wagering game network components (e.g., the wagering game machines 802) can include hardware and machine-readable media including instructions for performing the operations described herein.

Example Wagering Game Machine

Figure 9:
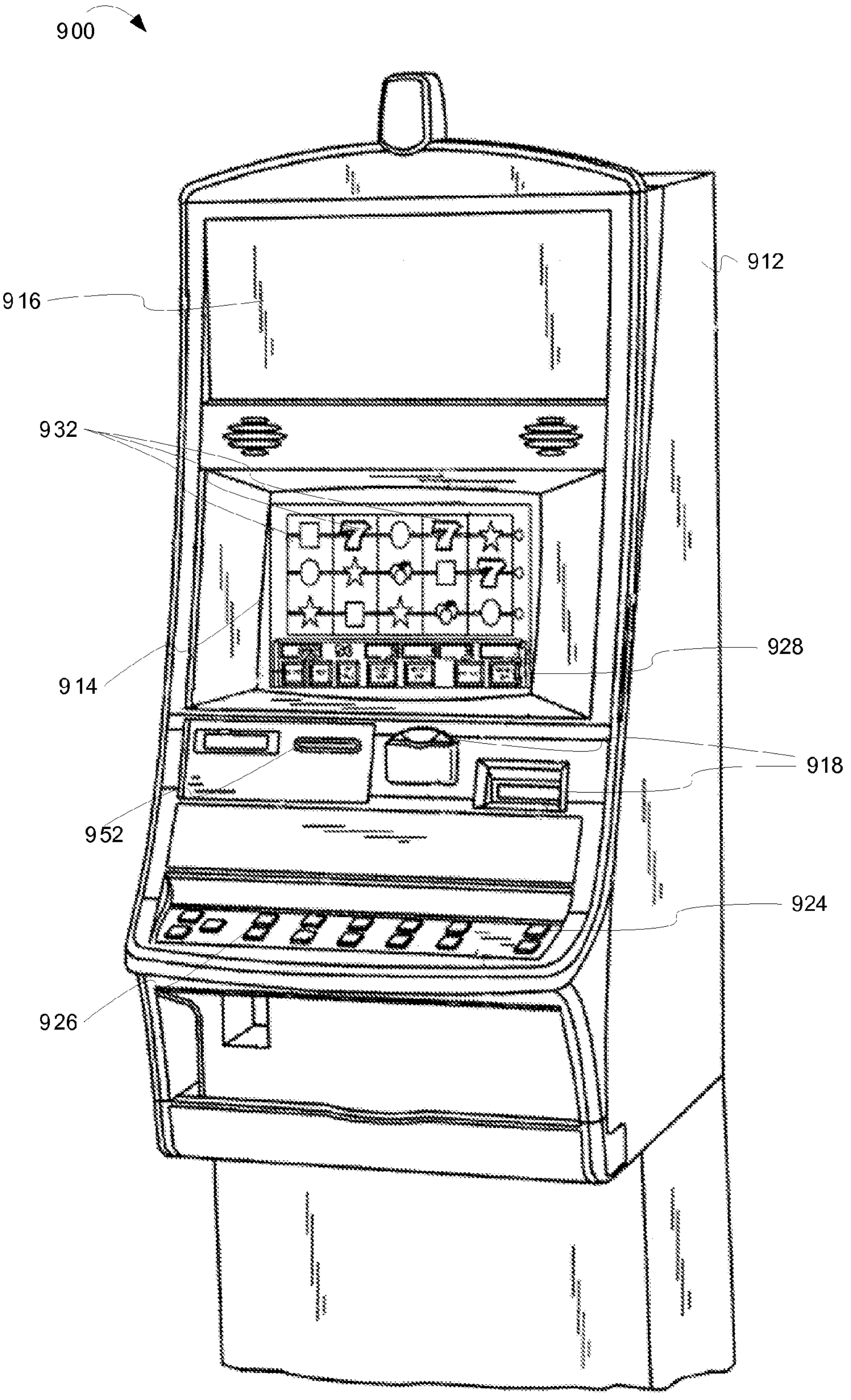
FIG. 9 depicts a perspective view of a wagering game machine, according to some example embodiments.

FIG. 9 depicts a perspective view of a wagering game machine, according to some example embodiments. Referring to FIG. 9, a wagering game machine 900 is used in gaming establishments, such as casinos. According to embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bartop model, mobile handheld model, or workstation console model.

A player begins playing a basic wagering game by making a wager via the value input device 918. The player can initiate play by using the player input device's buttons or touch screen 928. The basic game can include arranging a plurality of symbols along a payline 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

receiving a feed of a number of messages providing notification of wagering game activity, wherein the wagering game activity occurred via at least one of a wagering game machine at a wagering game establishment and an online wagering game website;

storing the number of messages into machine-readable media;

filtering the number of messages to create a subset of messages, wherein the filtering is based on at least one of an operator criteria defined by an operator providing the wagering game activity and a player criteria defined by a wagering game player, wherein the at least one of the operator criteria and the player criteria comprises:

a jackpot win that exceeds a threshold monetary amount, a progressive win that exceeds a threshold monetary amount, an entry into a bonus round, or a win where a monetary amount won exceeds a threshold multiplier of an amount wagered; and publishing the subset of messages to a computing device associated with the wagering game player, wherein the computing device is at least one of a wagering game machine and a mobile device capable of wireless communication, wherein the computing device comprises an input device configured to detect a physical item associated with monetary value that establishes a credit balances and to receive a cashout input that initiates a payout from the credit balance, and wherein the credit balance changes based on play of a wagering game.

2. The method of claim 1, wherein the at least one of the operator criteria and the player criteria comprises at least one of a positive response and a negative response to receipt of a previous published message by the wagering game player.

3. The method of claim 1, wherein the at least one of the operator criteria and the player criteria comprises at least one of:

wagering game activity from a wagering game having a defined theme;

wagering game activity by a defined wagering game player; and wagering game activity by wagering game players in a defined group of wagering game players.

4. The method of claim 1, wherein the at least one of the operator criteria and the player criteria comprises wagering game activity from a wagering game having a defined theme and playable at multiple wagering game machines of the at least one wagering game machine and where at least one of the multiple wagering game machines are available but not currently occupied by a wagering game player.

5. The method of claim 1, further comprising:

filtering the number of messages to create a different subset of messages, wherein the filtering is based on at least one of a different operator criteria defined by the operator providing the wagering game activity and a different player criteria defined by a different wagering game player, wherein the different subset of messages are different from the subset of messages based on the at least one different operator criteria and the different player criteria, and publishing the different subset of messages to a different computing device associated with the different wagering game player, the different computing device comprises at least one of a different wagering game machine and a different mobile device that is capable of wireless communication.

6. An apparatus comprising:

means for receiving a feed of a number of messages providing notification of wagering game activity, wherein the wagering game activity occurred via at least one of a wagering game machine at a wagering game establishment and an online wagering game website;

means for storing the number of messages;

means for filtering the number of messages to create a subset of messages, wherein the means for filtering is based on at least one of an operator criteria defined by an operator providing the wagering game activity and a player criteria defined by a wagering game player, wherein the at least one of the operator criteria and the player criteria comprises:

a jackpot win that exceeds a threshold monetary amount, a progressive win that exceeds a threshold monetary amount, an entry into a bonus round, and a win where a monetary amount won exceeds a threshold multiplier of an amount wagered; or means for publishing the subset of messages to a computing device associated with the wagering game player, wherein the computing device is at least one of a wagering game machine and a mobile device capable of wireless communication, wherein the computing device comprises an input device configured to detect a physical item associated with monetary value that establishes a credit balances and to receive a cashout input that initiates a payout from the credit balance, and wherein the credit balance changes based on play of a wagering game.

7. The apparatus of claim 6, wherein the at least one of the operator criteria and the player criteria comprises at least one of a positive response and a negative response to receipt of a previous published message by the wagering game player.

8. The apparatus of claim 6, wherein the at least one of the operator criteria and the player criteria comprises at least one of:

wagering game activity from a wagering game having a defined theme;

wagering game activity by a defined wagering game player; and wagering game activity by wagering game players in a defined group of wagering game players.

9. The apparatus of claim 6, wherein the at least one of the operator criteria and the player criteria comprises wagering game activity from a wagering game having a defined theme and playable at multiple wagering game machines of the at least one wagering game machine and where at least one of the multiple wagering game machines are available but not currently occupied by a wagering game player.

10. The apparatus of claim 6, further comprising:

means for filtering the number of messages to create a different subset of messages, wherein the means for filtering is based on at least one of a different operator criteria defined by the operator providing the wagering game activity and a different player criteria defined by the different wagering game player, wherein the different subset of messages are different from the subset of messages based on the at least one different operator criteria and the different player criteria, and means for publishing the different subset of messages to a different computing device associated with the different wagering game player, the different computing device comprising at least one of a different wagering game machine and a different mobile device capable of wireless communication.

11. One or more machine-readable storage media including instructions which, when executed by one or more processors, cause the one or more processors to perform operations comprising:

receive a feed of a number of messages providing notification of wagering game activity, wherein the wagering game activity occurred via at least one of a wagering game machine at a wagering game establishment and an online wagering game website;

store the number of messages into machine-readable media;

filter the number of messages to create a subset of messages, wherein the filtering is based on at least one of an operator criteria defined by an operator providing the wagering game activity and a player criteria defined by a wagering game player, wherein the at least one of the operator criteria and the player criteria comprises:

a jackpot win that exceeds a threshold monetary amount, a progressive win that exceeds a threshold monetary amount, an entry into a bonus round, or a win where a monetary amount won exceeds a threshold multiplier of an amount wagered; and publish the subset of messages to a computing device associated with the wagering game player, wherein the computing device is at least one of a wagering game machine and a mobile device capable of wireless communication, wherein the computing device comprises an input device configured to detect a physical item associated with monetary value that establishes a credit balances and to receive a cashout input that initiates a payout from the credit balance, and wherein the credit balance changes based on play of a wagering game.

12. The one or more machine-readable storage media of claim 11, wherein the at least one of the operator criteria and the player criteria comprises at least one of a positive response and a negative response to receipt of a previous published message by the wagering game player.

13. The one or more machine-readable storage media of claim 11, wherein the at least one of the operator criteria and the player criteria comprises at least one of:

wagering game activity from a wagering game having a defined theme;

wagering game activity by a defined wagering game player; and wagering game activity by wagering game players in a defined group of wagering game players.

14. The one or more machine-readable storage media of claim 11, wherein the at least one of the operator criteria and the player criteria comprises wagering game activity from a wagering game having a defined theme and playable at multiple wagering game machines of the at least one wagering game machine and where at least one of the multiple wagering game machines are available but not currently occupied by a wagering game player.

15. The one or more machine-readable storage media of claim 11, wherein the operations comprise:

filter the number of messages to create a different subset of messages, wherein the filtering is based on at least one of a different operator criteria defined by the operator providing the wagering game activity and a different player criteria defined by a different wagering game player, wherein the different subset of messages are different from the subset of messages based on the at least one different operator criteria and the different player criteria, and publish the different subset of messages to a different computing device associated with the different wagering game player, the different computing device comprises at least one of a different wagering game machine and a different mobile device that is capable of wireless communication.

16. An apparatus comprising:

a processor;

a message receiver module executable on the processor, the message receiver module configured to, receive a feed of a number of messages providing notification of wagering game activity, wherein the wagering game activity occurred via at least one of a wagering game machine at a wagering game establishment and an online wagering game website; and store the number of messages;

a filter module executable on the processor, the filter module configured to, filter the number of messages to create a subset of messages, wherein the filtering is based on at least one of an operator criteria defined by an operator providing the wagering game activity and a player criteria defined by a wagering game player, wherein the at least one of the operator criteria and the player criteria comprises:

a jackpot win that exceeds a threshold monetary amount, a progressive win that exceeds a threshold monetary amount, an entry into a bonus round, or a win where a monetary amount won exceeds a threshold multiplier of an amount wagered; and a publisher module executable on the processor, the publisher module configured to publish the subset of messages to a computing device associated with the wagering game player, wherein the computing device is at least one of a wagering game machine and a mobile device capable of wireless communication, wherein the computing device comprises an input device configured to detect a physical item associated with monetary value that establishes a credit balances and to receive a cashout input that initiates a payout from the credit balance, and wherein the credit balance changes based on play of a wagering game.

17. The apparatus of claim 16, wherein the at least one of the operator criteria and the player criteria comprises at least one of a positive response and a negative response to receipt of a previous published message by the wagering game player.

18. The apparatus of claim 16, wherein the at least one of the operator criteria and the player criteria comprises at least one of:

wagering game activity from a wagering game having a defined theme;

wagering game activity by a defined wagering game player; and wagering game activity by wagering game players in a defined group of wagering game players.

19. The apparatus of claim 16, wherein the at least one of the operator criteria and the player criteria comprises wagering game activity from a wagering game having a defined theme and playable at multiple wagering game machines of the at least one wagering game machine and where at least one of the multiple wagering game machines are available but not currently occupied by a wagering game player.

20. The apparatus of claim 16, wherein the operations comprise:

wherein the filter module is configured to filter the number of messages to create a different subset of messages, wherein the filter is based on at least one of a different operator criteria defined by the operator providing the wagering game activity and a different player criteria defined by a different wagering game player, wherein the different subset of messages are different from the subset of messages based on the at least one different operator criteria and the different player criteria, and wherein the publisher module is configured to publish the different subset of messages to a different computing device associated with the different wagering game player, the different computing device comprises at least one of a different wagering game machine and a different mobile device that is capable of wireless communication.

* * * * *